United States Patent
Singh et al.

(10) Patent No.: US 11,770,291 B2
(45) Date of Patent: Sep. 26, 2023

(54) DETERMINING READINESS FOR SWITCHOVER OPERATIONS FOR NETWORK DEVICES

(71) Applicant: Arista Networks, Inc., Santa Clara, CA (US)

(72) Inventors: Chetandeep Singh, Pleasanton, CA (US); Itthichok Jangjaimon, San Jose, CA (US); Pawan Hulyalkar, Fremont, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/501,907

(22) Filed: Oct. 14, 2021

(65) Prior Publication Data

US 2023/0121682 A1 Apr. 20, 2023

(51) Int. Cl.
G06F 15/173 (2006.01)
G06F 15/16 (2006.01)
H04L 41/0695 (2022.01)
H04L 41/0663 (2022.01)
H04L 41/0654 (2022.01)

(52) U.S. Cl.
CPC ...... *H04L 41/0695* (2013.01); *H04L 41/0654* (2013.01); *H04L 41/0663* (2013.01)

(58) Field of Classification Search
CPC ............. H04L 41/0695; H04L 41/0663; H04L 41/0654
USPC .................................. 709/223–224, 202–203
See application file for complete search history.

(56) References Cited

U.S. PATENT DOCUMENTS

| | | | |
|---|---|---|---|
| 6,347,073 B1 * | 2/2002 | Hiscock | G06F 11/2005 714/25 |
| 7,835,357 B2 * | 11/2010 | Panwar | H04L 45/745 370/388 |
| 9,571,337 B1 * | 2/2017 | Xu | H04L 41/0803 |
| 11,425,034 B1 * | 8/2022 | Boopathy | H04L 43/0823 |
| 2003/0154431 A1 * | 8/2003 | Lin | G06F 11/1675 714/48 |
| 2006/0271810 A1 * | 11/2006 | Hsu | G06F 1/263 714/4.11 |
| 2012/0281522 A1 * | 11/2012 | Kumar | H04L 1/1809 370/217 |
| 2015/0317221 A1 * | 11/2015 | Sampath | H04L 41/0654 714/4.11 |
| 2019/0034300 A1 * | 1/2019 | Devilbiss | G06F 11/2033 |

(Continued)

*Primary Examiner* — Bharat Barot
(74) *Attorney, Agent, or Firm* — Fountainhead Law Group P.C.

(57) ABSTRACT

Embodiments of the present disclosure include systems and methods for determining readiness for switchover operations for network devices. A policy definition specifying a set of criteria and a set of instructions is received. Based on the set of instructions, a first supervisor module is determined whether it is ready for a switchover operation based on the set of criteria. The switchover operation includes a second supervisor module configured as a backup to the first supervisor module taking over for the first supervisor module. A set of conditions are determined whether they are satisfied. When the set of conditions are determined to be satisfied and the first supervisor module is determined to be ready for the switchover operation, the switchover operation is triggered to cause the second supervisor module to take over for the first supervisor module.

20 Claims, 6 Drawing Sheets

(56) References Cited

U.S. PATENT DOCUMENTS

| | | | |
|---|---|---|---|
| 2019/0146887 A1* | 5/2019 | Blea .................... | G06F 11/2023 |
| | | | 714/4.11 |
| 2021/0227054 A1* | 7/2021 | Khan .................... | H04L 43/028 |
| 2022/0200885 A1* | 6/2022 | Bajaj ................... | H04L 41/0663 |

* cited by examiner

DETERMINING READINESS FOR SWITCHOVER OPERATIONS FOR NETWORK DEVICES

BACKGROUND

Modular network devices are network devices in which the hardware can be modified. For example, many of the hardware modules such as network interfaces, power supplies, cooling fans, etc. may be replaced when they malfunction. In addition, network interfaces, power supplies, cooling fans, etc. can be added to modular network devices or any of these existing hardware can be upgraded with newer and faster versions. This way, modular network devices provide flexibility to adapt the hardware as network requirements change. Typically, a modular network device includes, among other components, one or more supervisor components and one or more line cards. A supervisor component is responsible for managing other hardware in the modular networking switch. Also, a supervisor component contains all the logic for processing (e.g., routing, forwarding, etc.) data that the network switch receives. A line card usually includes one or more network interfaces through which data is received and processed.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiments of the present disclosure as defined by the claims may include some or all of the features in these examples alone or in combination with other features described below, and may further include modifications and equivalents of the features and concepts described herein.

Described herein are techniques for determining readiness for switchover operations for network devices. In some embodiments, a network device includes an active supervisor card, a standby supervisor card, and a set of line cards. A line card includes a set of interwork interfaces through which network data (e.g., packets) is received and/or transmitted as well as a set of processors for forwarding network data. A supervisor card may be responsible for, among other functions, managing the control plane of the network device. An active supervisor card can be a supervisor that is currently managing the control plane of the network device. A standby supervisor card may serve as a backup supervisor card that can take over for an active supervisor (e.g., the active supervisor fails, upgrading or updating the active supervisor card with the standby supervisor card, etc.). The process of transitioning a supervisor card from operating as a standby supervisor card to operating as an active supervisor card can be referred to as a switchover or a switchover operation.

In some embodiments, an active supervisor card of a network device utilizes policies to determine whether it is ready for a switchover operation. A policy definition can specify a set of criteria and a set of instructions for determining whether the active supervisor card is ready for a switchover operation based on the set of criteria. Different policy definitions may specify different sets of criteria and/or different sets of instructions. In this manner, an active supervisor card can be configured to determine whether it is ready for a switchover operation in different ways. In addition, an active supervisor card of a network device may employ a dynamic decision approach to determine readiness for a switchover operation. For example, an active supervisor card can make an initial determination whether it is ready for a switchover operation based on a set of criteria (e.g., criteria specified in a policy definition, one or more fixed criteria, etc.). Whenever the active supervisor card receives a change to a criteria in the set of criteria, the active supervisor card re-evaluates whether it is ready for a switchover operation. Under this approach, the switchover readiness of the active supervisor card may dynamically change in response to changes to any criteria upon which the switchover readiness determination is based.

Figure 1:
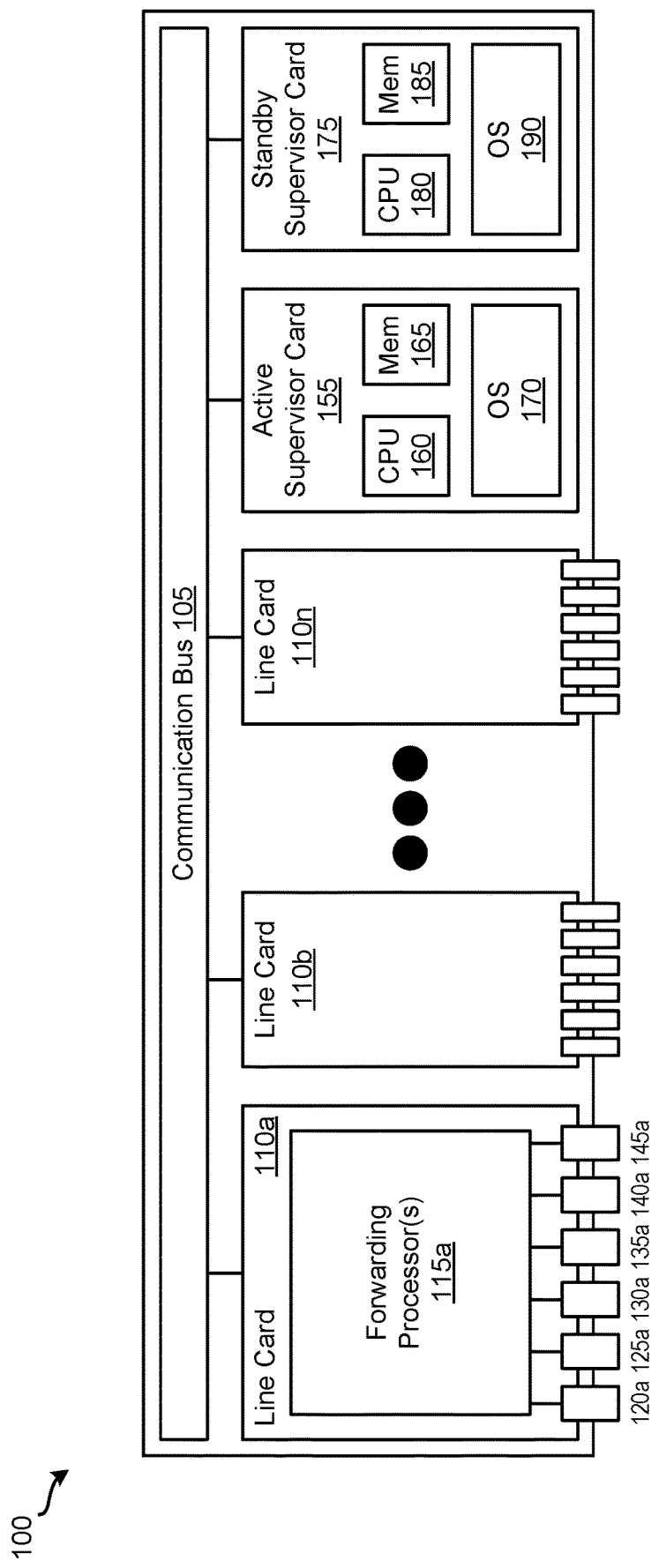
FIG. 1 illustrates an architecture of a network device according to some embodiments.

FIG. 1 illustrates an architecture of a network device 100 according to some embodiments. As shown, network device 100 includes communication bus 105, line cards 110*a-n*, active supervisor card 155, and standby supervisor card 175. Line cards 110*b*-110*n* are not shown in the same level of detail as line card 110*a* for the sake of simplicity and clarity. One of ordinary skill in the art will understand that line cards 110*b-n* may be implemented in the same or similar manner as that shown for line card 110*a*. Communication bus 105 is communicatively coupled to line cards 110*a-n*, active supervisor card 155, and standby supervisor card 175. Communication bus 105 is configured to facilitate communication among these components. In some embodiments, communication bus 105 can be implemented by a set of fabric modules. In some such embodiments, the set of fabric modules use a Peripheral Component Interconnect Express (PCIE) standard.

As illustrated in FIG. 1, line card 110*a* includes forwarding processor(s) 115*a* and ports 120*a*, 125*a*, 130*a*, 135*a*, 140*a*, 145*a* communicatively coupled to forwarding processor 115*a*. In some embodiments, forwarding processor 115*a* can be implemented as one or more application-specific integrated circuits (ASICs). Ports 120*a*-145*a* may be Ethernet ports in some embodiments.

Forwarding processor 115*a* is configured to process packets received through ports 120*a* 125*a*, 130*a*, 135*a*, 140*a*, 145*a*. For instance, when forwarding processor 115*a* receives a packet through one of the ports 120*a*, 125*a*, 130*a*, 135*a*, 140*a*, 145*a*, forwarding processor 115*a* examines the packet in order to determine where to forward the packet. In some instances, forwarding processor 115*a* may determine that the packet is to be forwarded out through one of the ports 120*a*, 125*a*, 130*a*, 135*a*, 140*a*, 145*a* and, thus, sends it out of the determined port. In other instances, forwarding processor 115*a* may determine that the packet is to be forwarded out through a port on one of the other line cards 110*b-n*. In such cases, forwarding processor 115*a* sends, via communication bus 105, the packet to the appropriate line card 110*b-n* for processing.

In some embodiments, active supervisor card 155 is configured to operate in an active mode where active supervisor card 155 manages and/or controls the operation of network device 100 (e.g., manages the control plane, configures line cards 110*a-n*, etc.). Standby supervisor card 175 is configured to operate in a standby mode where standby supervisor card 175 is prepared to take over for active supervisor card 155. Active supervisor card 155 is also configured to synchronize its state information with standby supervisor card 175 (e.g., using the synchronization mechanism described below). A switchover operation may be triggered when a set of defined conditions are determined to be satisfied and an active supervisor card determines that it is ready for the switchover operation. Examples of such conditions include an active supervisor failing or malfunctioning; network device 100 received a manual switchover request; etc. When a switchover operation is triggered, standby supervisor card 175 takes over for active supervisor card 155 by transitioning from operating in a standby mode to operating in an active mode. Since active supervisor card 155 has been synchronizing its state information with standby supervisor card 175, standby supervisor card 175 is configured in the same or similar state as active supervisor card 155. This allows standby supervisor card 175 to take over for active supervisor card 155 in a seamless and transparent manner without any data loss (e.g., protocols (e.g., layer 2 protocols, layer 3 protocols, routing protocols, link aggregation group (LAG) protocols, spanning tree protocols (STPs), etc.) maintain their adjacencies and do not lose their partners). In other words, standby supervisor card 175 provides a hardware and software based fault tolerance mechanism (e.g., hardware and software redundancy) for active supervisor card 155.

As shown in FIG. 1, active supervisor card 155 includes central processing unit (CPU) 160, memory 165, and operating system (OS) 170. In some embodiments, CPU 160 may be a general purpose processor, such as an Intel®/AMD® x86 or ARM®-based processor, that operates under the control of software stored in memory 165. Memory 165 is configured to store software instructions (e.g., OS 170) for execution by CPU 160. Memory 165 can include a number of memories including a main random access memory (RAM) for storing instructions and data during program execution and a read-only memory (ROM) for storing fixed instructions. Active supervisor card 155 may also include a file storage system (not shown) for providing persistent (i.e., non-volatile) storage of program and data files (e.g., OS 170) and can include a magnetic or solid-state hard disk drive, an optical drive along with associated removable media (e.g., CD-ROM, DVD, Blu-Ray, etc.), a removable flash memory-based drive or card, and/or other types of storage media known in the art.

OS 170 is a software program executable on network device 100 that performs a variety of functions (e.g., control plane functions) for facilitating the operation of network device 100. For example, OS 170 executes one or more routing protocols (e.g., border gateway protocol (BGP), open shortest path first (OSPF), intermediate system to intermediate system (IS-IS), etc.) to discover the network topology of the network(s) to which network device 100 belongs and/or communicatively coupled. OS 170 may generate the various data structures mentioned above (e.g., a routing information base (RIB), a forwarding information base (FIB), a label information base (LIB), a label forwarding information base (LFIB), etc.) for facilitating the routing and forwarding of data (e.g., network packets) through network device 100. Based on the generated data structures, OS 170 programs hardware resources in network device 100 (e.g., forwarding processor 115*a* and forwarding processors in line cards 110*b*-110*n*) in order to implement routing and forwarding operations stored in the data structures.

In some embodiments, OS 170 has multiple different processes running on it. Such processes may be referred to as agents or agent processes. Each of these processes can be configured to handle certain tasks and/or perform certain operations. For instance, some agents are configured to manage a particular piece of hardware of network device 100 (e.g., an agent configured to manage a particular line card 110, an agent configured to manage the communication bus 105, etc.). As another example, some agents may be responsible for the forwarding operations of network device 100. As yet another example, some agents can be configured to manage different protocols (e.g., an agent configured to manage a bidirectional forwarding detection (BFD) protocol, an agent configured to manage a label distribution protocol (LDP), an agent configured to manage a link aggregation control protocol (LACP), an agent configured to manage a LAG protocol, an agent configured to manage a multiprotocol label switching (MLPS) protocol, an agent configured to manage a STP, an agent configured to manage a virtual routing and forwarding (VRF) protocol, an agent configured to manage a segment routing for traffic engineering (SR-TE) protocol, an agent configured to manage a tunneling protocol, etc.). Other types of agents include an agent configured to manage a command line interface for network device 100, an agent configured to manage in-memory storages (e.g., storages 245, 250, 255), etc.

Similar to active supervisor card 155, standby supervisor card 175 includes CPU 180, memory 185, and OS 190. CPU 180 may be the same and/or similar to CPU 160 and memory 185 may be the same and/or similar to memory 165. OS 190 can perform the same and/or similar functions as OS 170. In addition, OS 190 may have the same or similar processes running on it.

FIG. 1 illustrates an example of a network device that can be used to implement various embodiments of the present invention. One of ordinary skill in the art will appreciate that many other configurations of network device 100 having additional and/or different components are possible. For example, a line card may include any number of forwarding processors, a line card may include more than six ports, network device 100 may include more than two supervisor cards (e.g., one active supervisor card and several standby supervisor cards), etc.

Figure 2:
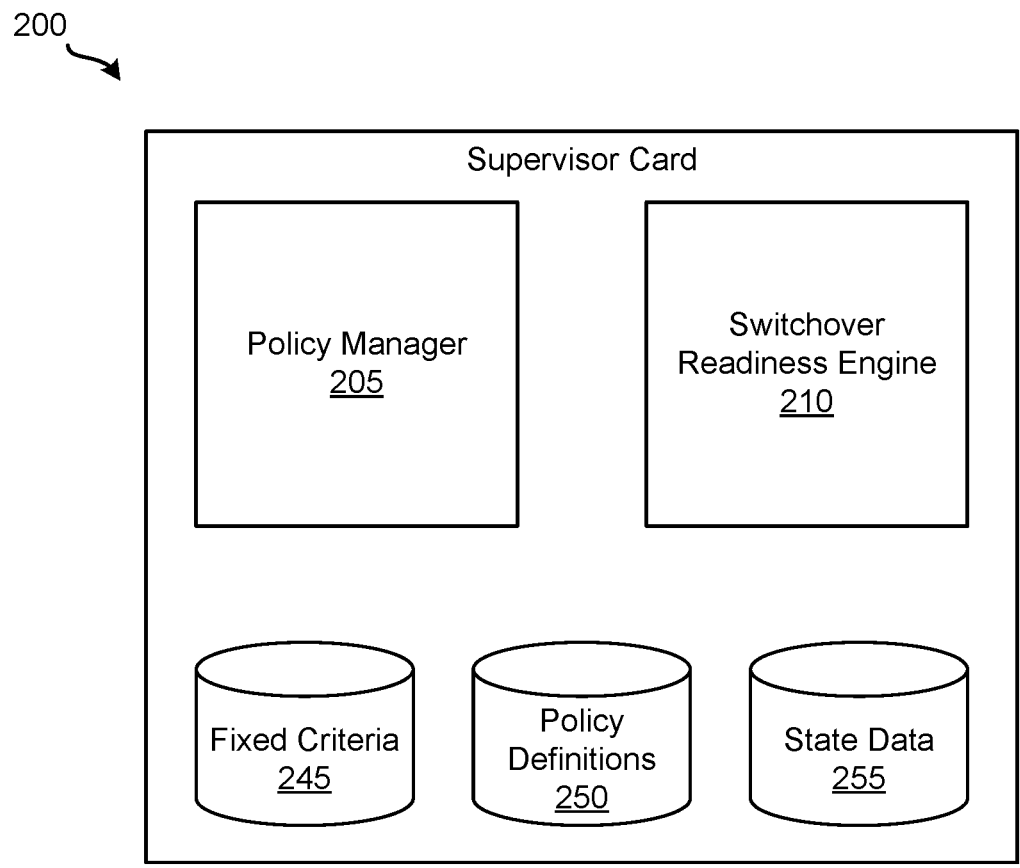
FIG. 2 illustrates an architecture of a supervisor card according to some embodiments.

FIG. 2 illustrates an architecture of a supervisor card 200 according to some embodiments. In some embodiments, supervisor card 200 can be used to implement active supervisor card 155 and standby supervisor card 175. As depicted in FIG. 2, supervisor card 200 includes policy manager 205, switchover readiness engine 210, and storages 245, 250, 255. Fixed criteria storage 245 stores a set of fixed criteria to be used for determining switchover readiness. Policy definitions storage 250 is configured to store policy definitions. In some embodiments, a policy definition specifies a set of criteria to be used for determining switchover readiness and a set of instructions for how to determine switchover readiness based on the set of criteria.

State data storage 255 stores state information associated with supervisor card 200 and/or other supervisor cards. Examples of state information associated with a supervisor card may include the status of different hardware components in network device 100 (e.g., the status of light emitting diodes (LEDs) (e.g., colors of LEDs), the status of fan (e.g., on, off, operating speed, cooling level ok, insufficient fans, fan uninitialized, fan failed, incompatible fans, etc.), the status of power (e.g., power capacity, power being consumed, etc.), the status of network interfaces (e.g., ports are forwarding data, ports are down, etc.), control plane state information (e.g., the state of routing tables, the state of virtual routing and forwarding (VRF) tables, etc.), etc.

In some embodiments, state data storage 255 may be used as a mechanism for synchronizing state information between supervisor cards. For instance, a first supervisor card (e.g., active supervisor card 155) and a second supervisor card (e.g., standby supervisor card 175) can each have a state data storage. Each supervisor card stores its own state information in its respective state data storage. To synchronize the state information of the first supervisor card with the second supervisor card, the state data storage of the second supervisor card is configured as a subscriber of state information stored in the state data storage of the first supervisor card. Thus, when the first supervisor card adds state information to, updates state information in, or deletes state information from, its state data storage, the first supervisor card publishes these operations to the state data storage of the second supervisor card. In this fashion, the state data storage of the second supervisor card can have an up to date version of the state information of the first supervisor card.

Policy manager 205 is responsible for managing policy definitions. For example, policy manager 205 may receive a policy definition from a user of network device 100 via an interface provided by network device 100 (e.g., a command line interface provided by OS 170). In response, policy manager 205 stores the policy definition in policy definitions storage 250. In some cases, policy manager 205 can receive from switchover readiness engine 210 a request for a policy definition. In response to the request, policy manager 205 accesses policy definitions storage 250 to retrieve the requested policy definition. Then, policy manager 205 sends the policy definition to switchover readiness engine 210.

Switchover readiness engine 210 is configured to determine whether supervisor card 200 is ready for a switchover operation. In some embodiments, when switchover readiness engine 210 determines that supervisor card 200 is ready for a switchover operation, it signifies that a switchover feature is enabled. It does not signify a switchover operation is starting or about to start. In other words, when switchover readiness engine 210 determines that it is ready for a switchover operation, switchover readiness engine 210 has determined the switchover operation is allowed to be performed if an event was to occur that satisfies a set of defined conditions for triggering the switchover operation (e.g., the supervisor card 200 failed, network device 100 received a manual switchover request, etc.). To determine whether it is ready for a switchover operation, switchover readiness engine 210 accesses policy definitions storage 250 to retrieve a specified (e.g., by a user) policy definition.

Figure 3:
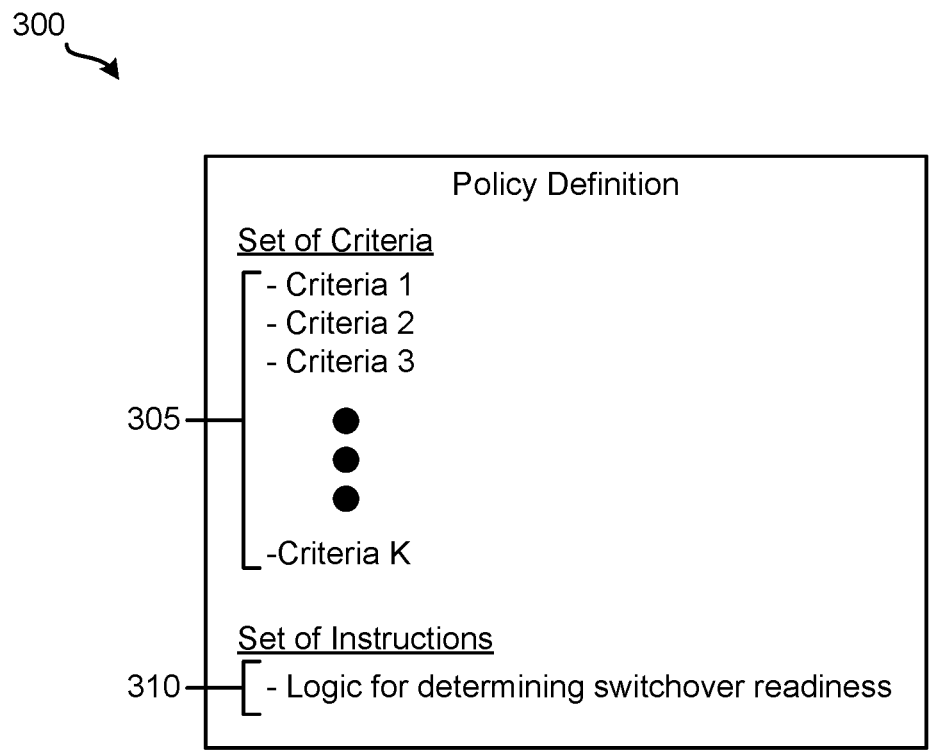
FIG. 3 illustrates an example policy definition according to some embodiments.

FIG. 3 illustrates an example policy definition 300 according to some embodiments. As shown, policy definition 300 includes a set of criteria 305 and a set of instructions 310. In this example, set of criteria 305 includes criteria 1-k. A policy definition can specify any number of different types of criteria. Examples of criteria can include a temperature status of a temperature associated with a network device or a supervisor card (e.g., a temperature sensed at a location within or near the network device, a temperature sensed at a location within or near the supervisor card) is at a defined status (e.g., temperature ok, temperature sensor failure, temperature is overheating, temperature is critical, temperature is over a defined threshold value, etc.); utilization of a processor of a supervisor card is less than a defined threshold value (e.g., 60% utilization, 75% utilization, 90% utilization, etc.); a supervisor card is operating in a mode other than a defined mode (e.g., a low-memory mode where the supervisor card is configured to terminate a set of defined processes (e.g., non-essential processes) and perform operations to free up memory); a fan status of a set of fans associated with a network device (e.g., a set of fans included in the network device) is at a defined status (e.g., fan is on, fan is off, fan is operating at a defined speed (e.g., 800 revolutions per minute (RPM), 1200 RPM, 2000 RPM, etc.), fan cooling level is ok, insufficient fans, fan is uninitialized, fan failed, fan is incompatible, etc.); utilization of power by a network device is below a defined threshold value (e.g., 50% power consumption, 25% power consumption, 10% power consumption, etc.); a set of defined files (e.g., a set of system files, a set of configuration files, a set of encryption keys, etc., or any combination thereof) are synchronized between a set of supervisor cards (e.g., an active supervisor card and a standby supervisor card); etc.

Some criteria in set of criteria 305 can be specified to be applied to an active supervisor card, a standby supervisor card, or both the active supervisor card and the standby supervisor card. For instance, if a particular criteria in the set of criteria 305 is utilization of a processor of a supervisor card is less than a defined threshold value, the criteria can be specified to be applied to an active supervisor card, a standby supervisor card, or both the active supervisor card and the standby supervisor card. In some embodiments where the particular criteria is applied to both the active supervisor and the standby supervisor, different threshold values may be defined for each of the supervisors. Other criteria mentioned above can be defined in this manner in a policy definition. In some embodiments, the mechanism described above for synchronizing state information between supervisor cards can be used to obtain the appropriate information to determine whether a criteria is satisfied with respect to a particular supervisor card.

Set of instructions 310 include the logic for determining switchover readiness based on set of criteria 305. Different instructions can be provided for different logic for determining switchover readiness based on set of criteria 305. For instance, set of instructions 310 may specify that each criteria in the set of criteria 305 is to be satisfied in order for a supervisor card to be ready for a switchover operation. In some instances, set of instructions 310 specifies a list of different subsets of the set of criteria 305. In such instances, set of instructions 310 further specifies that at least one subset of the set of criteria 305 in the list is to be satisfied in order for a supervisor card to be ready for a switchover operation. Referring to policy definition 300 as an example, the list of subsets can specify a first subset that includes criteria 1, 2, and 4; a second subset that includes criteria 2 and 3; and a third subset that includes criteria 1, k-1, and k. Only one of the subsets of criteria need to be satisfied to determine that a supervisor card is ready for a switchover operation.

Returning to FIG. 2, switchover readiness engine 210 then accesses fixed criteria storage 245 to retrieve a set of fixed criteria. In some embodiments, each criteria in the set of fixed criteria is to be satisfied in order for a supervisor card to be determined to be ready for a switchover operation. Examples of fixed criteria include a set of agents operating on a supervisor card are each in a defined state (e.g., a ready state); a set of devices connected to an active supervisor card (e.g., via a communication bus like communication bus 105) matches a set of devices connected to a standby supervisor card (e.g., via a communication bus like communication bus 105); an amount of time has elapsed since a supervisor card booted up is greater than a defined amount of time (e.g., five minutes, ten minutes, fifteen minutes, etc.); etc.

Based on the set of criteria and the set of instructions specified in the policy definition and the set of fixed criteria, switchover readiness engine 210 determines whether supervisor card 200 is ready for a switchover operation. Then, switchover readiness engine 210 may store the results of the determination (e.g., supervisor card 200 is ready for a switchover operation or supervisor card 200 is not ready for a switchover operation) in state data storage 255.

In some embodiments, switchover readiness engine 210 can receive notifications indicating a change to a criteria specified in a policy definition or a fixed criteria. In response to such a notification, switchover readiness engine 210 determines whether supervisor card 200 is ready for a switchover operation based on the set of criteria and the set of instructions specified in the policy definition and the set of fixed criteria. Switchover readiness engines 200 then updates the determination stored in state data storage 255 with this new determination.

Figure 4:
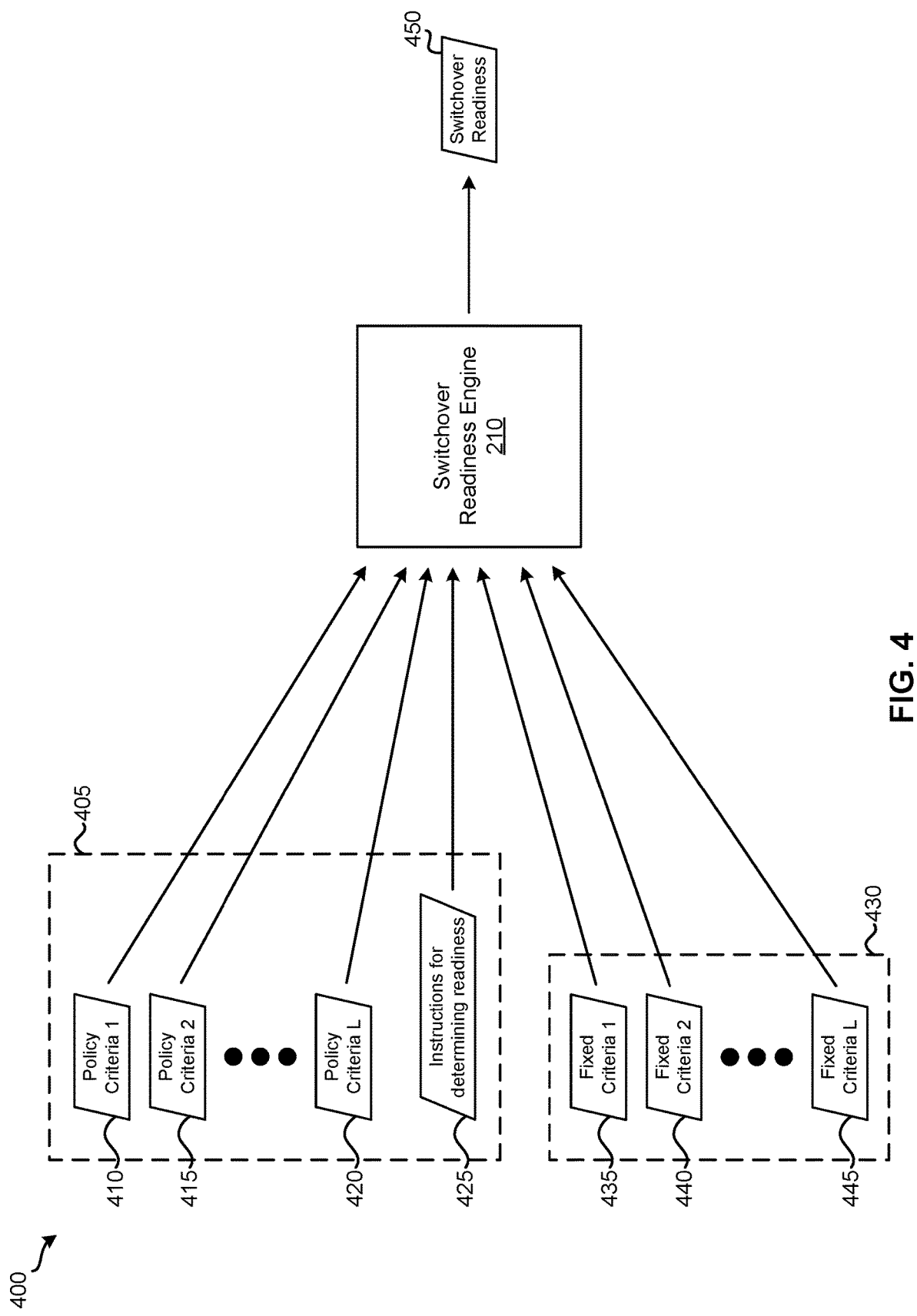
FIG. 4 illustrates an example dataflow for determining switchover readiness according to some embodiments.
Figure 5:
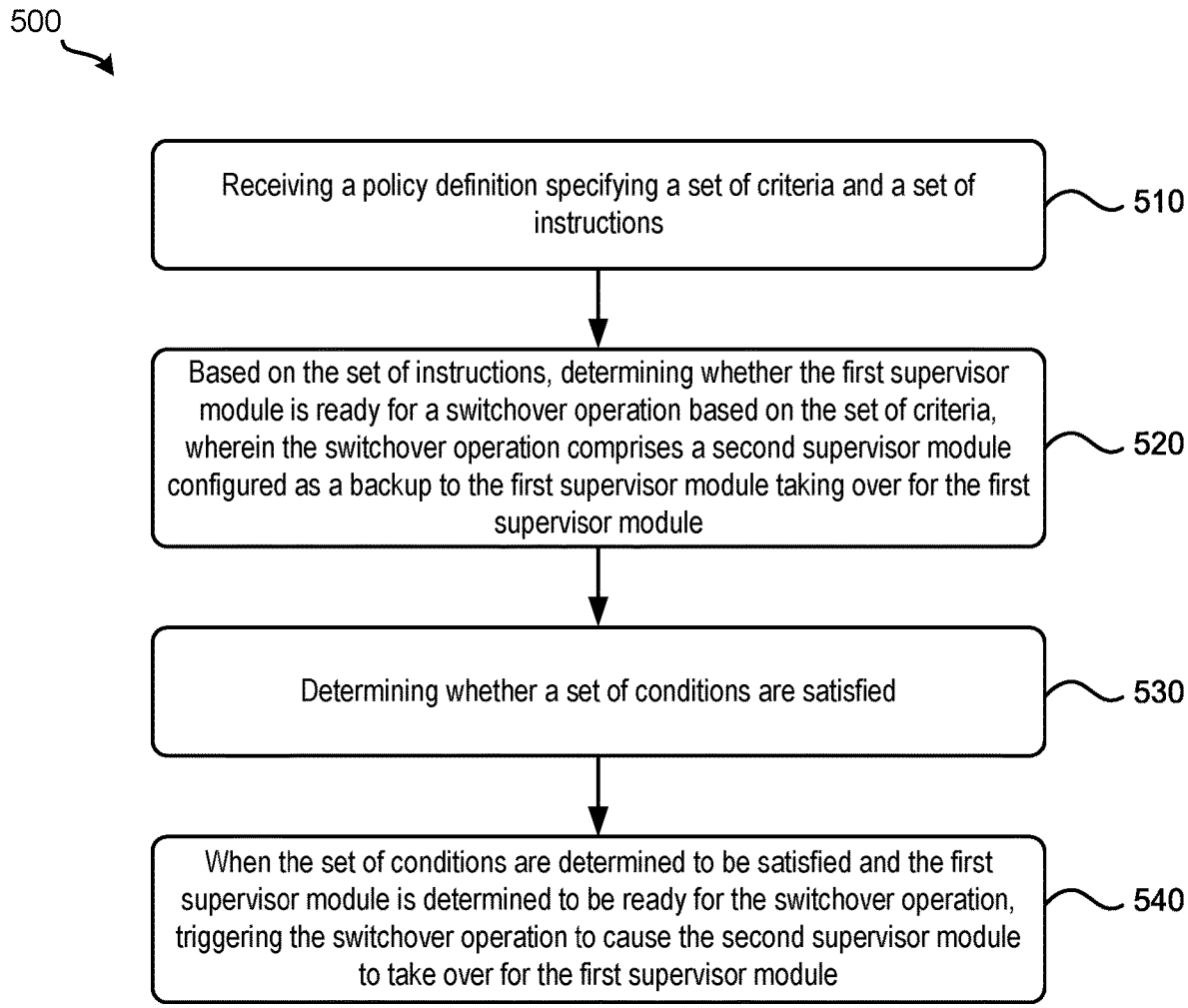
FIG. 5 illustrates a process for switchover readiness according to some embodiments.

FIG. 4 illustrates an example dataflow 400 for determining switchover readiness according to some embodiments. Dataflow 400 may occur for an initial determination of switchover readiness or for a determination of switchover readiness in response to switchover readiness engine 210 receiving a change to a criteria used to make a determination of switchover readiness. In this example, switchover readiness engines 210 is operating on an active supervisor card (e.g., active supervisor card 155). Dataflow 400 begins by switchover readiness engine 210 accessing policy definitions storage 250 to retrieve a specified policy definition 405 and accessing fixed criteria storage 245 to retrieve a set of fixed criteria 430. As illustrated, policy definition 405 includes a set of criteria 410, 415, 420 and a set of instructions 425. For this example, the set of instructions 425 specifies that each criteria in the set of criteria 410, 415, 420 is to be satisfied in order for the active supervisor card to be ready for a switchover operation. Additionally, some of the set of criteria 410, 415, 420 may be specified to be applied to the active supervisor card and a standby supervisor card (e.g., standby supervisor card 175). Therefore, to satisfy one of these criteria, the criteria has to be satisfied with respect to the supervisor card and satisfied with respect to the standby supervisor card.

Set of fixed criteria 430 can include any number of the fixed criteria explained above. To determine whether the active supervisor card is ready for a switchover operation, switchover readiness engine 210 uses the set of instructions 425 to determine whether the active supervisor card is ready for a switchover operation based on the set of criteria 410, 415, 420. As mentioned above, the set of instructions 425 specifies that each criteria in the set of criteria 410, 415, 420 is to be satisfied in order for the active supervisor card to be ready for a switchover operation. If the set of criteria 410, 415, 420 are not all satisfied, switchover readiness engine 210 determines that the active supervisor card is not ready for a switchover operation.

If the set of criteria 410-420 are all satisfied, switchover readiness engine 210 proceeds to process the set of fixed criteria 430. Here, switchover readiness engine 210 determines that the active supervisor card is ready for a switchover operation if each of the criteria 435-445 in the set of fixed criteria 430 are satisfied. One or more of the fixed criteria 435-445 can be specified to be applied to the active supervisor card and the standby supervisor card. As such, such a fixed criteria has to be satisfied with respect to the supervisor card and satisfied with respect to the standby supervisor card in order for the fixed criteria to be satisfied. If not all of the criteria 435-445 in the set of fixed criteria 430 are satisfied, switchover readiness engine 210 determines that the active supervisor card is not ready for a switchover operation. Once switchover readiness engine 210 makes a determination, switchover readiness engine 210 generates output 450 indicating the determination (e.g., the active supervisor card is ready for a switchover operation or the active supervisor card is not ready for a switchover operation). Switchover readiness engine 210 can store output 450 in state data storage 255.

If the set of criteria 410, 415, 420 are all satisfied, switchover readiness engine 210 proceeds to process the set of fixed criteria 430. Here, switchover readiness engine 210 determines that the active supervisor card is ready for a switchover operation if each of the criteria 435, 440, 445 in the set of fixed criteria 430 are satisfied. One or more of the fixed criteria 435, 440, 445 can be specified to be applied to the active supervisor card and the standby supervisor card. As such, such a fixed criteria has to be satisfied with respect to the supervisor card and satisfied with respect to the standby supervisor card in order for the fixed criteria to be satisfied. If not all of the criteria 435, 440, 445 in the set of fixed criteria 430 are satisfied, switchover readiness engine 210 determines that the active supervisor card is not ready for a switchover operation. Once switchover readiness engine 210 makes a determination, switchover readiness engine 210 generates output 450 indicating the determination (e.g., the active supervisor card is ready for a switchover operation or the active supervisor card is not ready for a switchover operation). Switchover readiness engine 210 can store output 450 in state data storage 255.

The dataflow described above by reference to FIG. 4 shows an example of using a single policy definition to determine whether a supervisor card is ready for a switchover operation. In some embodiments, different policy definitions can be used under different defined conditions. For example, for a first defined set of conditions, switchover readiness engine 210 may use a first policy definition to make its switchover readiness determination; for a second defined set of conditions, switchover readiness engine 210 may use a second policy definition to make its switchover readiness determination; for a third defined set of conditions, switchover readiness engine 210 may use a third policy definition to make its switchover readiness determination; and so on and so forth. In such cases, switchover readiness engine 210 determines a set of defined conditions that is satisfied. Then, switchover readiness engine 210 can use the policy definition associated with the set of conditions to make its switchover readiness determination.

Based on the set of instructions, process 500 determines, at 520, whether the first supervisor module is ready for a switchover operation based on the set of criteria. The switchover operation includes a second supervisor module configured as a backup to the first supervisor module taking over for the first supervisor module. Referring to FIGS. 1, 2, and 4 as an example, switchover readiness engine 210 can determine whether supervisor card 155 is ready for a switchover operation based on set of criteria 410, 415, 420 specified in policy definition 405 based on set of instructions 425 specified in policy definition 405.

Next, process 500 determines, at 530, whether a set of conditions are satisfied. Finally, when the set of conditions are determined to be satisfied and the first supervisor module is determined to be ready for the switchover operation, process 500 triggers, at 540, the switchover operation to cause the second supervisor module to take over for the first supervisor module. As described above, a switchover operation may be triggered when a set of defined conditions are determined to be satisfied (e.g., the supervisor card 200 failed, network device 100 received a manual switchover request, etc.) and an active supervisor card determined that it is ready for the switchover operation.

Figure 6:
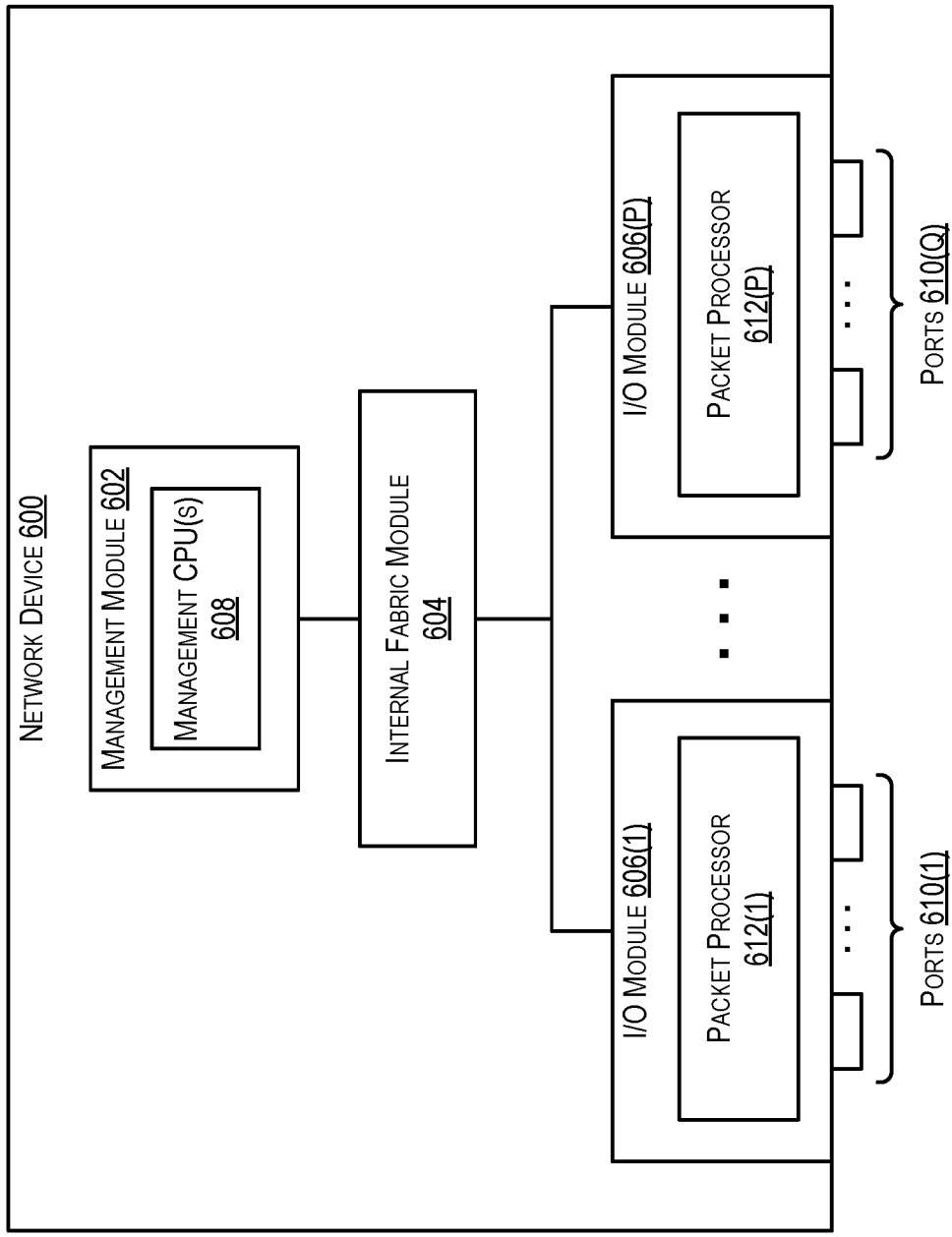
FIG. 6 illustrates an example network device according to some embodiments.

FIG. 6 illustrates the architecture of an example network device (e.g., a network switch or router) 600 that may implement the techniques of the present disclosure according to certain embodiments. For example, network device 600 may correspond to network device 100 shown in FIG. 1.

Network device 600 includes a management module 602, an internal fabric module 604, and a number of I/O modules 606(1)-(P). Management module 602 includes one or more management CPUs 608 for managing/controlling the operation of the device. Each management CPU 608 can be a general-purpose processor, such as an Intel/AMD x86 or ARM-based processor, that operates under the control of program code maintained in an associated volatile memory and/or stored in a non-transitory computer readable storage medium (not shown). In one set of embodiments, this program code can include code for implementing some or all of the techniques described in the foregoing sections.

Internal fabric module 604 and I/O modules 606(1)-(P) collectively represent the data, or forwarding, plane of network device 600. Internal fabric module 604 is configured to interconnect the various other modules of network device 600. Each I/O module 606 includes one or more input/output ports 610(1)-(Q) that are used by network device 600 to send and receive network packets. Each I/O module 606 can also include a packet processor 612, which is a hardware processing component that can make wire speed decisions on how to handle incoming or outgoing network packets.

It should be appreciated that network device 600 is illustrative and other configurations having more or fewer components than network device 600 are possible.

The following are some example embodiments of the present disclosure. In some embodiments, a network device includes a set of hardware modules configured to receive and forward network data. The network device further includes a first supervisor module configured to control the set of hardware modules. The network device also includes a second supervisor module configured as a backup to the first supervisor module. The first supervisor module is further configured to determine whether the first supervisor module is ready for a switchover operation between the first supervisor module and the second supervisor module based on a policy definition specifying a set of criteria and a set of instructions for determining whether the first supervisor module is ready for the switchover operation based on the set of criteria.

In some embodiments, the first supervisor is further configured to receive a change to a criteria in the set of criteria and, in response to receiving the change, determine whether the first supervisor module is ready for the switchover operation between the first supervisor module and the second supervisor module based on the set of criteria and the set of instructions specified in the policy.

In some embodiments, the set of criteria is a first set of criteria. Determining whether the first supervisor module is ready for the switchover operation between the first supervisor module and the second supervisor module is further based on a second set of criteria. The second set of criteria includes an amount of time elapsed since the first supervisor module booted up is greater than a defined amount of time. The second set of criteria includes a set of agents operating on the first supervisor module that are each in a defined operating status.

In some embodiments, the set of instructions specifies that each criteria in the set of criteria is to be satisfied.

In some embodiments, the set of instructions specifies a list of different subsets of the set of criteria and each criteria in at least one subset in the list is to be satisfied.

In some embodiments, the set of criteria comprises a temperature status of a temperature associated with the network device is at a defined status.

In some embodiments, the set of criteria comprises utilization of a processor of the first supervisor module is less than a defined threshold value.

In some embodiments, the set of criteria comprises the first supervisor module is operating in a mode other than a low-memory mode.

In some embodiments, the set of criteria comprises a fan status of a set of fans associated with the network device at a defined status.

In some embodiments, the set of criteria comprises utilization of power by the network device is below a defined threshold value.

In some embodiments, the set of criteria comprises a set of defined files are synchronized between the first supervisor module and the second supervisor module.

In some embodiments, the first supervisor module is further configured to synchronize state information associated with the first supervisor module with the second supervisor module.

In some embodiments, the network device is configured to determine whether a set of defined conditions are satisfied and, upon determining that the set of defined conditions are satisfied, triggering the switchover operation.

In some embodiments, the switchover operation comprises the second supervisor module taking over control of the set of hardware modules for the first supervisor module.

In some embodiments, a method executable by a first supervisor module of a network device. The method receives a policy definition specifying a set of criteria and a set of instructions. Based on the set of instructions, the method further determines whether the first supervisor module is ready for a switchover operation based on the set of criteria. The switchover operation includes a second supervisor module configured as a backup to the first supervisor module taking over for the first supervisor module. The method also determines whether a set of conditions are satisfied. When the set of conditions are determined to be satisfied and the first supervisor module is determined to be ready for the switchover operation, the method further triggers the switchover operation to cause the second supervisor module to take over for the first supervisor module.

In some embodiments, the method further receives a change to a criteria in the set of criteria and, in response to receiving the change, determines whether the first supervisor module ready for the switchover operation between the first supervisor module and the second supervisor module based on the set of criteria and the set of instructions specified in the policy.

In some embodiments, the set of criteria is a first set of criteria. Determining whether the first supervisor module is ready for the switchover operation between the first supervisor module and the second supervisor module is further based on a second set of criteria.

In some embodiments, a system includes a set of processing units and a non-transitory machine-readable medium that stores instructions. The instructions cause at least one processing unit to receive a policy definition specifying a set of criteria and a set of instructions. Based on the set of instructions, the instructions further cause the at least one processing unit to determine whether the first supervisor module is ready for a switchover operation based on the set of criteria. The switchover operation includes a second supervisor module configured as a backup to the first supervisor module taking over for the first supervisor module. The instructions also cause the at least one processing unit to determine whether a set of conditions are satisfied. When the set of conditions are determined to be satisfied and the first supervisor module is determined to be ready for the switchover operation, the instructions further cause the at least one processing unit to trigger the switchover operation to cause the second supervisor module to take over for the first supervisor module.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method executable by a first supervisor module of a network device, the method comprising:
receiving a policy definition specifying a first set of criteria and a set of instructions specifying which of the first set of criteria must be satisfied for the first supervisor module to be determined to be ready for a switchover operation;
based on the set of instructions, determining whether the first supervisor module is ready for the switchover operation,
wherein the switchover operation comprises placing a second supervisor module configured as a backup to the first supervisor module in an active mode taking over the first supervisor module;
determining whether a set of conditions are satisfied; and
when the set of conditions are determined to be satisfied and after the first supervisor module is determined to be ready for the switchover operation, triggering the switchover operation to cause the second supervisor module to be in the active mode.

2. The method of claim 1 further comprising:
receiving a change to a criteria in the first set of criteria; and
in response to receiving the change, updating the determining of whether the first supervisor module is ready for the switchover operation based on the policy definition.

3. The method of claim 1 wherein determining whether the first supervisor module is ready for the switchover operation is additionally based on satisfying a second set of criteria.

4. A system comprising:
a set of processing units; and
a non-transitory machine-readable medium storing instructions that when executed by at least one processing unit in the set of processing units cause the at least one processing unit to:
receive a policy definition specifying a set of criteria and a set of instructions specifying which of the set of criteria must be satisfied for a first supervisor module to be determined to be ready for a switchover operation;
based on the set of instructions, determine whether the first supervisor module is ready for a switchover operation based on the set of criteria,
wherein the switchover operation comprises placing a second supervisor module configured as a backup to the first supervisor module in an active mode taking over for the first supervisor module;
determine whether a set of conditions are satisfied; and
when the set of conditions are determined to be satisfied and after the first supervisor module is determined to be ready for the switchover operation, trigger the switchover operation to cause the second supervisor module to be in the active mode.

5. The system of claim 4, wherein the set of criteria comprises: a fan status of a set of fans associated with the system is at a defined status, utilization of power by the system is below a defined threshold value, utilization of a processor of the first supervisor module is less than a defined threshold value, the first supervisor module is operating in a mode other than a low-memory mode, or a temperature status of a temperature associated with the system is at a defined status.

6. A network device comprising:
a set of hardware modules configured to receive and forward network data;
a first supervisor module configured to control the set of hardware modules when in an active mode; and
a second supervisor module configured as a backup to the first supervisor; and
wherein the first supervisor module is further configured to determine whether the first supervisor module is ready for a switchover operation based on a policy definition,
said policy definition specifying: a first set of criteria and a set of instructions specifying which of the first set of criteria must be satisfied for the first supervisor module to be determined to be ready for the switchover operation,
wherein the switchover operation comprises placing the second supervisor module in the active mode configured to control the set of hardware modules taking over for the first supervisor module.

7. The network device of claim 6, wherein the first supervisor module is further configured to:
receive a change to a criteria in the first set of criteria; and
in response to receiving the change, update the determination of whether the first supervisor module is ready for the switchover operation based on the policy definition.

8. The network device of claim 6, wherein determining whether the first supervisor module is ready for the switchover operation is additionally based on satisfying a second set of criteria.

9. The network device of claim 8, wherein the second set of criteria comprises an amount of time elapsed since the first supervisor module booted up is greater than a defined amount of time.

10. The network device of claim 8, wherein the second set of criteria comprises a set of agents operating on the first supervisor module that are each in a defined operating status.

11. The network device of claim 6, wherein the set of instructions specifies that each criteria in the first set of criteria is to be satisfied.

12. The network device of claim 6, wherein the set of instructions specifies a list of different subsets of the first set of criteria and each criteria in at least one subset is to be satisfied.

13. The network device of claim 6, wherein the first set of criteria comprises a temperature status of a temperature associated with the network device is at a defined status.

14. The network device of claim 6, wherein the first set of criteria comprises utilization of a processor of the first supervisor module is less than a defined threshold value.

15. The network device of claim 6, wherein the first set of criteria comprises the first supervisor module is operating in a mode other than a low-memory mode.

16. The network device of claim 6, wherein the first set of criteria comprises a fan status of a set of fans associated with the network device at a defined status.

17. The network device of claim 6, wherein the first set of criteria comprises utilization of power by the network device is below a defined threshold value.

18. The network device of claim 6, wherein the first set of criteria comprises a set of defined files are synchronized between the first supervisor module and the second supervisor module.

19. The network device of claim 6, wherein the first supervisor module is further configured to synchronize state information associated with the first supervisor module with the second supervisor module.

20. The network device of claim 6, wherein after the first supervisor module is determined to be ready for the switchover operation, the network device is further configured to:

determine whether a set of defined conditions are satisfied; and, upon determining that the set of defined conditions are satisfied, trigger the switchover operation.

* * * * *